(No Model.)

F. R. DE LISLE.
KEY FASTENER.

No. 377,020. Patented Jan. 31, 1888.

Witnesses
Chas. F. Schmelz
Mark A Heath

Inventor
Frank R. DeLisle
By his Attorney
S. Scholfield

UNITED STATES PATENT OFFICE.

FRANK R. DE LISLE, OF NORTH ATTLEBOROUGH, MASSACHUSETTS.

KEY-FASTENER.

SPECIFICATION forming part of Letters Patent No. 377,020, dated January 31, 1888.

Application filed September 20, 1887. Serial No. 250,265. (No model.)

*To all whom it may concern:*

Be it known that I, FRANK R. DE LISLE, a citizen of the United States, residing at North Attleborough, in the county of Bristol and State of Massachusetts, have invented a new and useful Improvement in Key-Fasteners, of which the following is a specification.

My invention relates to that class of key-fasteners which are employed to prevent the turning of the key in the lock by burglars; and it consists in the improved combination of the key-holding hook with the hook which engages with the shank of the knob, as hereinafter fully set forth.

Figure 1:
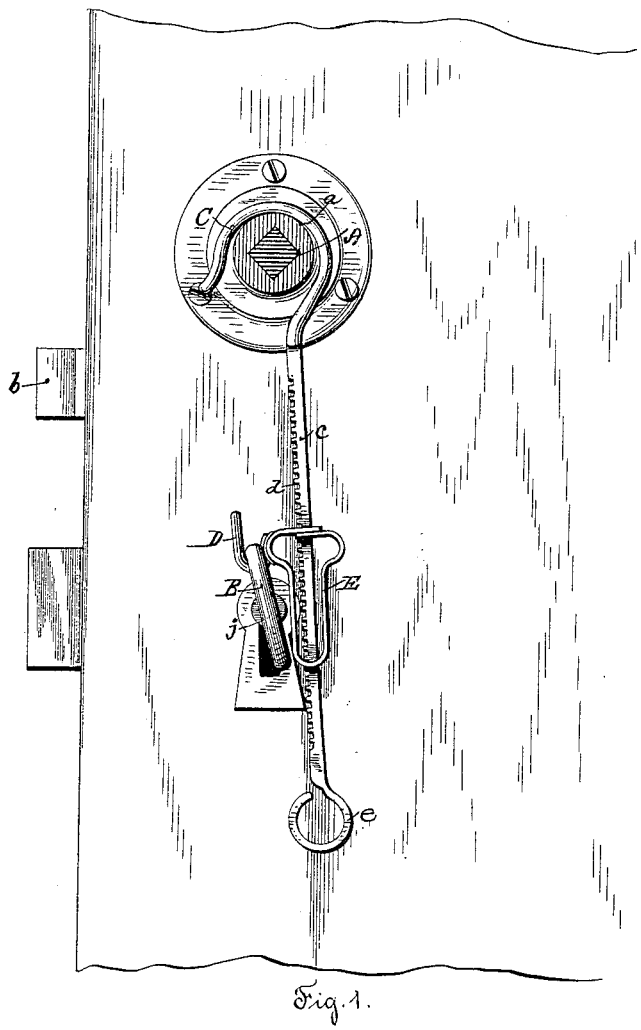
Figure 2:
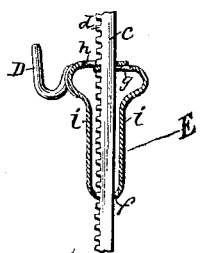

Figure 1 represents an elevation of my improved key-fastener when in position upon the door-knob and holding the key, the shank of the door-knob being shown in section. Fig. 2 is a detail section showing the spring-catch by means of which the proper adjustment of the key-holding hook is effected.

In the accompanying drawings, A is the spindle of the knob of the latch $b$, and B the key of the lock. The hook C, which engages with the shank $a$ of the knob, is provided with a shank, $c$, which at one side is provided with the series of notches $d$, and having at its end opposite the hook the eye or ring $e$. The key-holding hook D is attached to the sliding spring-catch E, formed of a strip of sheet metal which is folded in the form represented in Fig. 2, and provided with the slot $f$ at the folded end and the slots $g$ and $h$ at the inwardly-turned and lapped ends of the arms $i\,i$, the said slots being adapted to receive the shank $c$ of the hook C. The arms $i\,i$ are arranged to spring outward, so as to cause the end of one of the arms to engage with the notches of the shank $c$.

In using the fastener, the hook C is first caught over the knob-shank $a$ and the key B turned to lock the door. Then by pressing the spring-arms $i\,i$ of the sliding catch E toward each other, thus causing the disengagement of the catch-arm $i$ from the notches of the shank, the sliding catch E can be carried upward to cause the engagement of the hook D with the opening in the head $j$ of the key, as shown in Fig. 1. Then upon releasing the spring-arms $i\,i$ from pressure they will spring into engagement with the shank $c$, one of the said arms engaging with the back of the shank and the other engaging with one of the notches $d$ to hold the slide E in position, so that the key B cannot be turned in the lock from the outside.

I claim as my invention—

The combination, with the hook C, provided with the notched shank, of the sliding spring-catch E, provided with slots adapted to receive the shank and to engage the notches of the same, and the hook D, secured upon said catch and adapted to engage the key, substantially as and for the purpose specified.

FRANK R. DE LISLE.

Witnesses:
F. I. BORDEN,
FRED. B. BYRAM.